(12) United States Patent
Eklind

(10) Patent No.: US 6,312,050 B1
(45) Date of Patent: Nov. 6, 2001

(54) CHAIR STRUCTURE

(75) Inventor: Björn Eklind, Harestad (SE)

(73) Assignee: Volvo Car Corporation (SE)

( * ) Notice: Subject to any disclaimer, the term of this patent is extended or adjusted under 35 U.S.C. 154(b) by 0 days.

(21) Appl. No.: 09/733,892

(22) Filed: Dec. 9, 2000

Related U.S. Application Data

(63) Continuation of application No. PCT/SE99/01026, filed on Jun. 9, 1999.

(30) Foreign Application Priority Data

Jun. 9, 1998 (SE) .................................................. 9802033

(51) Int. Cl.⁷ .................................................. B60N 2/427
(52) U.S. Cl. .................................... 297/216.15; 297/216.2
(58) Field of Search ........................ 297/216.12, 216.13, 297/216.14, 216.15, 216.18, 216.2, 216.19

(56) References Cited

U.S. PATENT DOCUMENTS

| 3,953,068 | * | 4/1976 | Porsche et al. | 297/216.15 |
| 4,257,626 | * | 3/1981 | Adomeit | 297/216.2 X |
| 4,349,167 | * | 9/1982 | Reilly | 297/216.2 X |
| 5,823,619 | * | 10/1998 | Heilig | 297/216.13 X |
| 5,882,071 | * | 3/1999 | Föhl | 297/216.14 X |
| 6,019,424 | * | 2/2000 | Ruckert et al. | 297/216.14 X |
| 6,076,887 | * | 6/2000 | Andersson | 297/216.15 X |

* cited by examiner

*Primary Examiner*—Peter R. Brown
(74) *Attorney, Agent, or Firm*—Kilpatrick Stockton LLP

(57) ABSTRACT

Chair structure (1) for a vehicle comprises a backrest (2), a seat (3) which has a front part (31) and a rear part (32), a support (4) which carries the squab (3), and means (10) to fasten the support to a vehicle floor. The chair structure (1) also includes a means (6) that makes the backrest (2) tilt forwardly relatively to the squab (3) in the event of an accident.

26 Claims, 6 Drawing Sheets

CHAIR STRUCTURE

RELATED PATENT APPLICATIONS

This is a continuation patent application of International Application Number PCT/SE99/01026 filed Jun. 9, 1999 entitled CHAIR STRUCTURE that designates the United States. The full disclosure of said application, in its entirety, is hereby expressly incorporated by reference into the present application.

TECHNICAL FIELD

The present invention relates to a seat structure intended to improve the safety of a passenger in a vehicle. The invention relates, in particular, to a seat structure that includes a means for generating a forward pivoting of the backrest when a collision or the like occurs, usually because the carrying vehicle has been involved in a collision or similar circumstance.

A BACKGROUND OF THE INVENTION

Crash safety is an important and much discussed area in the development of modern cars. Attempts at improving passenger safety are being made in many different ways. Among these is the provision of bar structures and bodyworks with crumple zones, active seat belts and airbags. These structures have been designed to absorb and spread, by means of controlled deformations, the energy impulse which the vehicle, together with the driver and passengers, are subjected to during a collision. A seat has traditionally been mounted in the vehicle in a fixed manner and has not been designed to absorb and spread the energy impulse or force in any defined way. In order to further improve safety, constructions have therefore recently been proposed in which energy absorbing elements are added to the seat structures; these elements being configured absorb energy in a controlled manner when the seat is subjected to an energy impulse in the event of a collision.

A serious problem in collisions is the risk of neck injuries, also referred to as whiplash injuries to passengers of the crashed vehicle. These injuries can also occur when collisions take place at relatively low speeds and with relatively low energy. The risk of injuries occurring increases when the passenger is not sitting directly against the backrest and headrest. During the course of a rear-end collision, the occupant is flung forwards even if that occupant is wearing a seat belt. When the restrictive limits of the seat belt are reached (the passenger presses against the seat belt and the seat belt becomes taught), then the occupant, in reaction to hitting the limiting seat belt, is flung backward against the backrest and headrest. The risk of injures is increased by the lack of ways to coordinate between these movements of the occupant and the movement of the back rest and the headrest.

Another problem in collisions is the risk of the passenger slipping forwards. This means that during a collision the passenger tends to slip forwards on the seat, and the passenger's knees risk hitting the front structure causing injury. A way of reducing the risk of slipping forwards is described in International Patent Application WO 93/01950 in which the seat structure allows the seat-cushion to move along a controlled, predetermined trajectory which is configured so that the front part of the seat moves upwards and forwards in a front-end collision. This means that the passenger, in order to slip forwards, has to do so along an upward slope. As the passenger moves along the upward slope, the normal force between the passenger's body and the seat is greater than it is in the case where the upward slope is not present. This causes the friction between traveler and the seat to be greater, and therefore the force component in the direction of movement is less. Both of these phenomena contribute to reducing the risk of the passenger slipping forwards. In addition, energy-absorbing members can be mounted on the seat structure and they contribute to the absorption of energy when the seat is moving along the predefined trajectory.

Seat structures like those described in WO 93/01950, however, have the following problems: The seat structure is mounted in a frame construction with milled-out tracks. This construction causes the total weight of the seat structure to be relatively high. Since great efforts are being made to reduce the weight of vehicles in order to achieve better economic operation and reduce impact on the environment, it is not acceptable for parts included in the vehicle to be made heavier than is necessary. In addition, seat structures according to WO 93/01950 have no movement trajectory for cases where the collision occurs from behind in a rear-end impact collision. This means that the risk of neck injuries occurring in rear impact collisions is not benefitted by this type of structure. Another disadvantage of seat structures according to WO 93/01950 is that the backrest does not include any function for increasing adaptability or coordination between the passenger and the backrest in the event of a collision, which among other things reduces the risk of whiplash injuries in a rear impact collision.

In view of the above described deficiencies associated with conventionally designed vehicular carried chair structures, the present invention has been developed. These enhancements and benefits are described in greater detail hereinbelow with respect to several alternative embodiments of the present invention.

DISCLOSURE OF THE INVENTION

The present invention in its several disclosed embodiments alleviates the drawbacks described above with respect to conventionally designed chair structures for vehicles and incorporates several additionally beneficial features.

In one aspect, the invention provides an improved seat structure for a vehicle which reduces the above problems or disadvantages of other seat designs. The seat structure is designed to permit adaptability or compensation between the passenger's movement and movement of the backrest and headrest of the seat structure in the event of a collision or the like. In particular, the seat structure includes means or mechanisms for generating a forward pivoting of the backrest assembly when a collision occurs. This reduces the risk of the passenger suffering neck injuries.

The invention contemplates a seat structure having a backrest, a seat portion that includes a front part and a rear part, a stand that supports the seat structure in the vehicle and which includes a means or arrangement for securing the stand in a vehicle. The invention is characterized by the included feature of a means or mechanism for generating a forward pivoting of the backrest when a collision or the like occurs.

In a preferred embodiment of the invention, the seat structure includes an articulated arm construction designed so that when the seat is displaced forwards relative to the vehicle and from its initial position, the front part of the seat moves upwards and the rear part of the seat moves downwards. Using this articulated arm construction, instead of a construction comprising a frame with milled-out tracks, the seating arrangement is made considerably lighter, while also maintaining passenger safety. The articulated arm construction also allows the movement of the articulated arm to be transformed in a functional manner into pivoting movement that pivots the backrest of the seat forwards in order to improve adaptability (conformance) between the backrest and the occupant; a functional feature that contributes to reducing the risk of passenger neck injuries.

The beneficial effects described above apply generally to the exemplary devices, mechanisms and methods disclosed herein for vehicular chair structures. The specific structures through which these benefits are delivered will be described in detail hereinbelow.

BRIEF DESCRIPTION OF DRAWINGS

The invention will now be described in greater detail in the following way, by example only, and with reference to the attached drawings, in which.

MODE(S) FOR CARRYING OUT THE INVENTION

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components or processes. Therefore, specific structural and functional details disclosed herein are not to be interpreted as limiting, but merely as a basis for the claims and as a representative basis for teaching one skilled in the art to variously employ the present invention.

Figure 1:
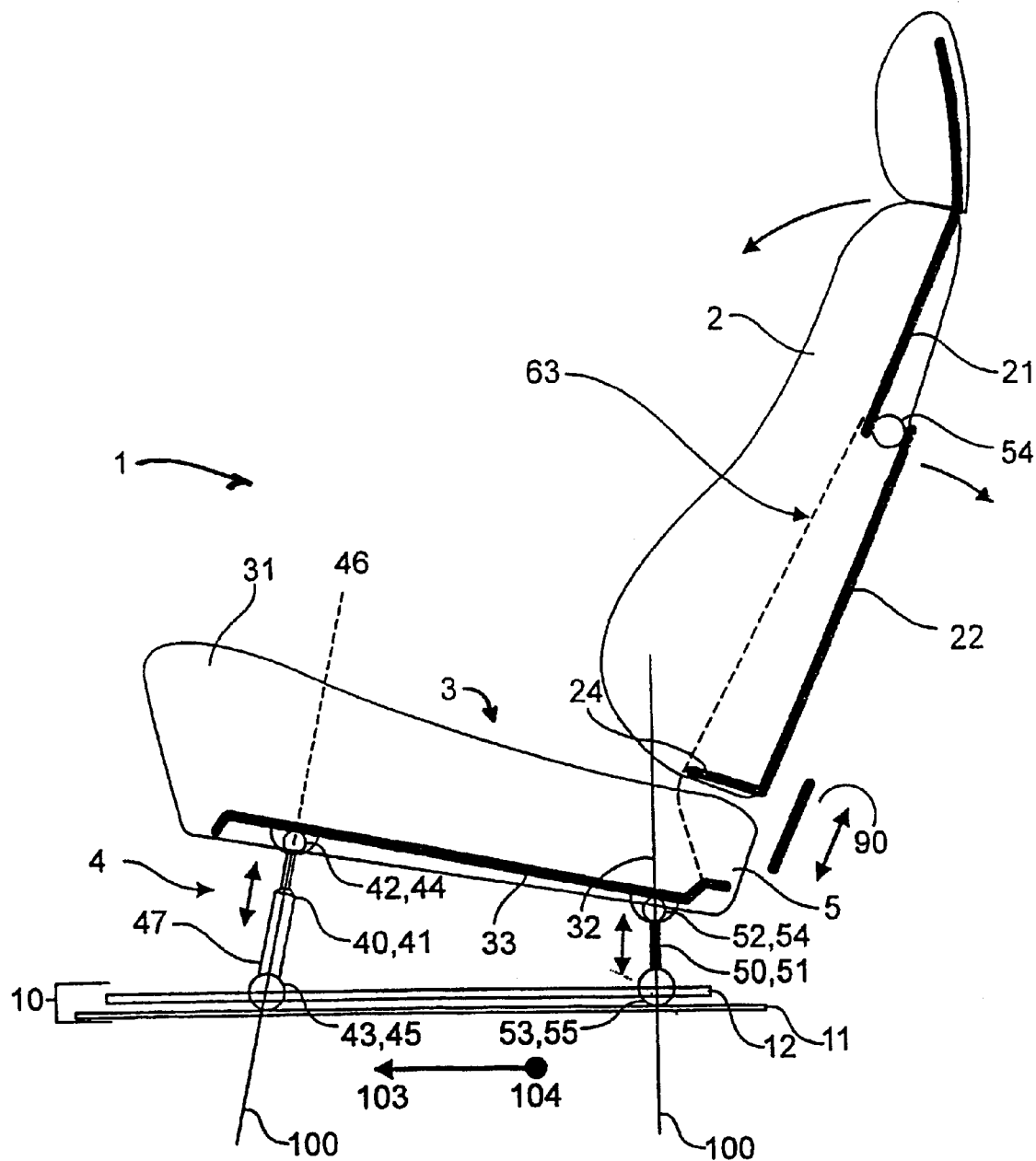
FIG. 1 is a schematic representation of a seat structure in a first position before a collision has occurred.

Referring to FIG. 1, a seat structure 1 is shown diagrammatically/schematically, that includes a backrest 2, a seat 3 and a stand 4 which supports the seat 3 and the backrest 2. The seat 3*the backrest 2 are connected to each her so as to pivot relative to one another via a hinge 26. The seat comprises a front part 31 and a rear part 32. The stand includes a means or mechanism 10 for affecting securement in a carrying vehicle. The means/mechanism 10 for securing the stand 4 to the vehicle preferably includes a pair of rails 11 that extend longitudinally with respect to the vehicle and in a runner 12 is secured in each and is configured to slide relative thereto. Arranged in a conventional manner on each runner 12 and rail 11 are locking members (not shown) for locking each respective runner 12 to its respective rail 11.

The locking members may be of the type that includes spring-tensioned or biased pins which are arranged to engage in recesses to achieve locking. When the locking member(s) have been brought into their open or unlocked positions, the stand 4 can slide, and the position of the seat 3 can be adjusted by the occupant to a desired position in the longitudinal direction parallel to a longitudinal axis 103 of the vehicle thereby obtaining the best possible comfort for that occupant. When the locking means/mechanism 10 has been brought to its locked position, the runner 1 2 is fixed to the rail 11 in such a secured manner that even if the seat structure 1 is subjected to high stresses, such as in the event of a collision, the locked connection will be maintained.

The stand 4 further includes a first mechanism 40, 50 arranged to allow the seat 3 to be displaced in a trajectory relative to the mechanism 10 from a first initial position 100 assumed by the seat 3 prior to a collision or the like, and a second position 101, 102 that the seat 3 assumes after having been subjected to the forces of a collision or similar occurrence.

The first mechanism 40, 50 includes an articulated arm construction arranged to allow the seat 3 to be displaced in a predetermined trajectory when the seat 3 is subjected to great force, such as in a collision. According to a first preferred embodiment, and which is shown in FIG. 1, this first mechanism 40, 50 includes a front articulated arm mechanism 40 and a rear articulated arm mechanism 50; front and rear being defined with respect to the direction of the longitudinal axis 103 of the vehicle. Both the front articulated arm mechanism 40 and the rear articulated arm mechanism 50 are preferably designed with articulated arm pairs 41, 51 which have two parallel and essentially straight rods that are joined to transverse rods to obtain good stability of the articulated arm mechanisms 40, 50. The front pair of articulated arms 41 has an upper end 42 that is secured to that part of the stand 4 supporting the seat 3, and a lower end 43 that is secured to that part of the stand 4 that adjoins the means/mechanism 10 for securing the assembly to the vehicle. The rear pair of articulated arms 51 has in the same way an upper end 52 that is connected to that part of the stand 4 that adjoins the means/mechanism 10 for securing the assembly to the vehicle.

To obtain an advantageous form of the trajectory which the seat 3 moves along during a collision, the front articulated arm pair 41 and the rear articulated arm pair 51 are designed as described hereinbelow. The front articulated arm pair 41 is longer then the rear articulated arm pair 51. The front articulated arm pair 41 is longer than the rear articulated arm pair 51 so that the distance between the upper 44 and lower 45 pivot points or axes of rotation of the front articulated arm pair is greater than the distance between the upper 54 and lower 55 pivot points of the rear articulated arm pair.

The front articulated arm pair 41 is secured in such a way that when the seat 3 assumes an initial position 100, the front articulated arm pair 41 extends along a main axis 46 which forms an angle with a longitudinal axis 103 of the vehicle. This means that the front articulated arm 41 slopes obliquely towards the rear when the seat 3 is in the initial position 100 and in such a way that the upper end 42 of the front articulated arm is placed behind the lower end 43 of the front articulated arm.

The rear articulated arm pair 51 is secured in such a way that when the seat assumes the initial position 100, the rear articulated arm pair 51 extends along a main axis 56 which extends essentially at right angles to the longitudinal axis 103 of the vehicle.

Both the front and the rear articulated arm mechanisms 40,50 are secured pivotably in a conventional manner to the seat 3 on the one hand, and on the other hand to the means/mechanism 10 for securing the seat structure 1 to the floor of the vehicle. This means that the articulated arm mechanisms 41,51, together with the seat 3, can be moved reciprocatingly along a predetermined path which is defined by the length of the articulated arms 41,51 included in the articulated arm mechanisms 40,50 and by their mutual attachment to the seat 3. On the seat 3 or the articulated arm mechanisms 40,50, there is a locking member (not shown) which holds the seat and the articulated arms in a predefined position referred herein to a first initial position 100 for so long as the seat structure is not subjected to great forces in a collision or the like.

When such a collision or the like occurs, the seat is conveyed forwards or rearwards depending on the direction of the force. This means that if the collision impact is from the front, which is the case when a vehicle is rapidly braked in a collision against an object or when an object collides with the front of the vehicle, the seat, the backrest and the stand are subjected to forces which convey these structures forwards in the vehicle. Conversely, the seat, the backrest and the stand will be conveyed rearwards in the vehicle if the vehicle is impacted from behind.

The movement of the seat is defined, as mentioned above, by the length of the articulated arms and by their mutual attachment to the seat. The rear articulated arm mechanism 50 is, as has already been mentioned, mounted essentially at right angles to the longitudinal direction of the vehicle, i.e. the upper 54 and lower 55 pivot points of the rear articulated arm mechanism are located essentially at the same length coordinates in the vehicle when the seat 3 is placed in its initial position. This means that when the seat is displaced from its first initial position 100, the distance between the upper pivot points 54 of the rear articulated arm mechanism and a plane which runs through the lower pivot points 45,55 of the front and rear articulated arm mechanisms will decrease. This means that the rear part 32 of the seat 3 is displaced in the direction towards the vehicle's floor structure when the seat 3 is displaced from its initial position 100, irrespective of whether the seat 3 is displaced forwards or rearwards with respect to the vehicle. As has been mentioned above, the front articulated arm mechanism 40 is secured in such a way that when the seat 3 assumes an initial position 100, the front articulated arm pair 41 extends along a main axis 46 which forms an angle a with a longitudinal axis in the vehicle 103. According to what has been described above, this angle is less than 90° when the seat is placed in its initial position 100. This means that when the seat is moved forwards in the vehicle's direction from its first initial position, the distance between the upper pivot points 44 of the front articulated arm mechanism and a plane which runs through the lower pivot points 45,55 of the front and rear articulated arm mechanisms will increase. This in turn means that the front part of the seat is displaced in the direction away from the vehicle's floor structure. If the seat is moved rearwards, however, the opposite takes place; this means that when the seat is moved rearwards in the vehicle from its initial or first position, the front part of the seat will be displaced in the direction towards the vehicle's floor structure.

The above should be understood to mean that when the seat 3 is displaced forwards in the vehicle's direction, the angle b between the horizontal plane 104 of the vehicle and a plane 105 running along the main extent of the seat 3 will increase. This means that in a collision from the front, in order to slip forwards, an occupant of the vehicle must do so along an upward slope with a greater inclination than is the case when the seat is in its initial position. This counteracts the tendency to detrimentally slip forwards as has been discussed hereinabove.

When the seat 3 is displaced rearwards, the distance between the upper pivot points of both the front and the rear articulated arm mechanisms and the horizontal plane of the vehicle decreases. Since on the one hand the front articulated arm mechanism 40 is longer, and on the other hand the rear articulated arm mechanism 50 is mounted essentially at right angles to the horizontal plane of the vehicle, the angle b between the plane 105 and the horizontal plane 104 of the vehicle increases. In this case where the seat is moved rearwards in the vehicle's direction, the increase in the angle b is less than when the seat is moved forwards in the vehicle's direction. Since the seat is displaced rearwards with respect to the vehicle in those cases where the collision is from the rear, he risk of slipping forwards does not arise. In this case, the occupant is pressed rearwards against the seat structure, which means that the slighter increase in inclination is also advantageous.

Figure 6:
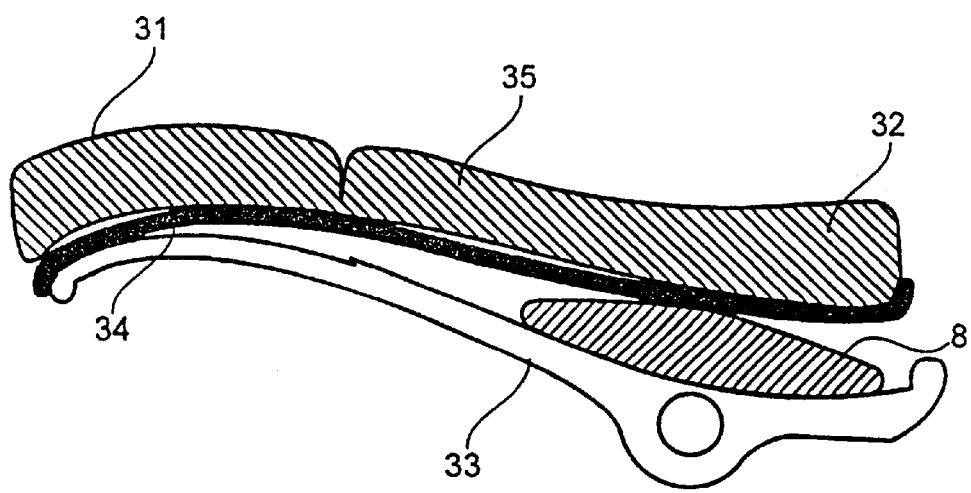
FIG. 6 shows a member for adjusting the height of the rear part of the seat.

In order to set the vertical position of the seat 3, both the front and rear articulated arm pairs 41,51 may be equipped with means/mechanism 47 for adjusting the length of both of the articulated arm pairs. In a preferred embodiment, these means/mechanisms for length adjustment include telescopically arranged articulated arms. The front articulated arm is preferably made telescopic, while the rear articulated arm is made rigid. This achieves a good adjustability, while at the same time the effective function of the system is ensured. In this case, the height of the rear part of the seat is regulated by an expandable member 8, for example a cushion, being mounted in the rear part of the seat as is exemplarily shown in FIG. 6.

In the illustrated instance, the expandable member 8 is mounted between a supporting frame 33 of the seat 3 and a reinforcement 34, for example a support plate 34 to which the seat padding 35 is secured. The supporting frame 33 forms a link part in the link parallelogram formed by the front articulated arm mechanism 40, rear articulated arm mechanism 50 and the supporting frame 33.

First members 9 for setting the angle of the backrest 2 are attached to the seat 3 or to the stand 4. These members are of a convention type and are therefore not further described herein.

Referring again to the Figures, there is means/mechanism 6 provided for generating a forward pivoting of the backrest 2 when the seat structure 3 is subjected to a collision or the like. The function and construction of the means/mechanism 6 will be described in greater detail in connection with the description of FIGS. 4 and 5.

A third member 7 is arranged on the seat 3 or stand 4 for absorbing energy when the seat 3 moves along its predetermined trajectory in the event of a collision or the like. This energy-absorbing third member 7 preferably has a gas damper which absorbs energy as the damper is compressed and/or drawn out.

The backrest 2 can be equipped with members for: setting the position of a headrest which forms part of the backrest, for setting a lumbar support, for setting the hardness of the backrest, or other conventional possibilities of setting comfort and safety aspects and properties of the seat 3.

Figure 2:
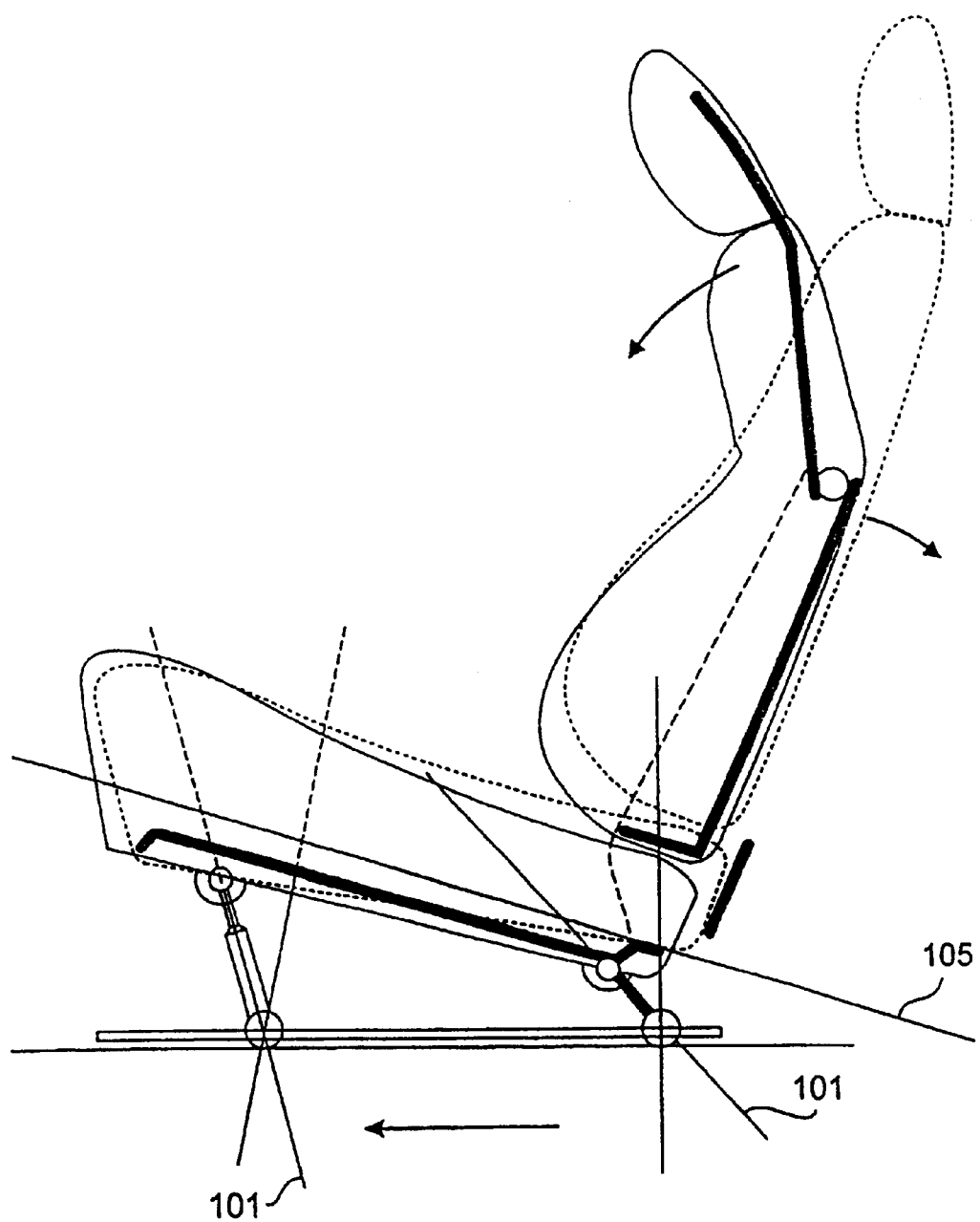
FIG. 2 is a schematic representation of the seat structure in a second position which is assumed when the seat has been displaced forwards in the vehicle after a collision has occurred.
Figure 3:
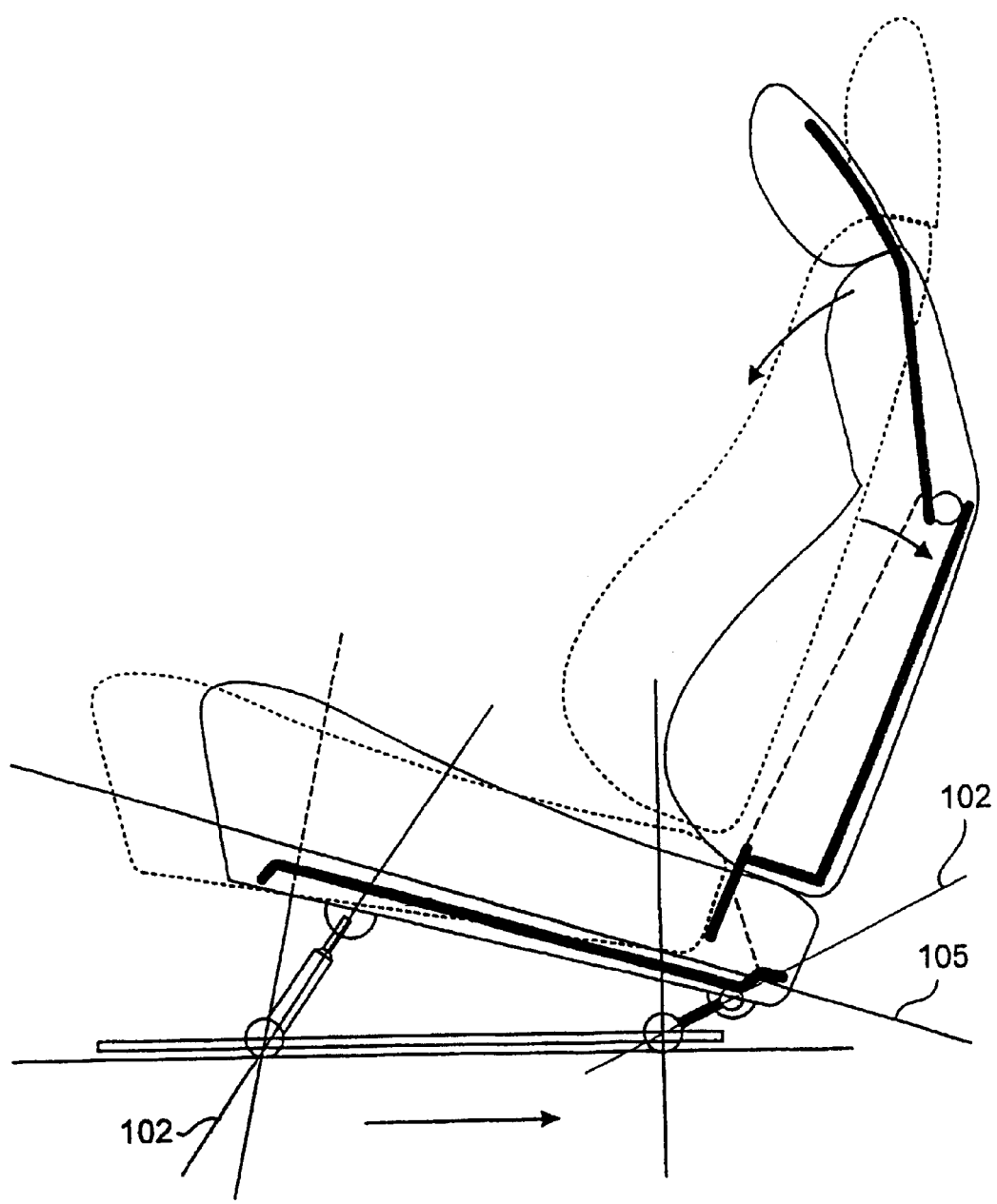
FIG. 3 is a schematic representation of a seat structure in a second position which is assumed when the seat has been displaced rearwards in the vehicle after a collision has occurred.

FIG. 2 shows the seat when it is displaced from its first initial position 100 forwards to a second position 101. FIG. 3 shows the seat when it has been displaced from its first initial position 100 rearwards to a second position 102.

Figure 4:
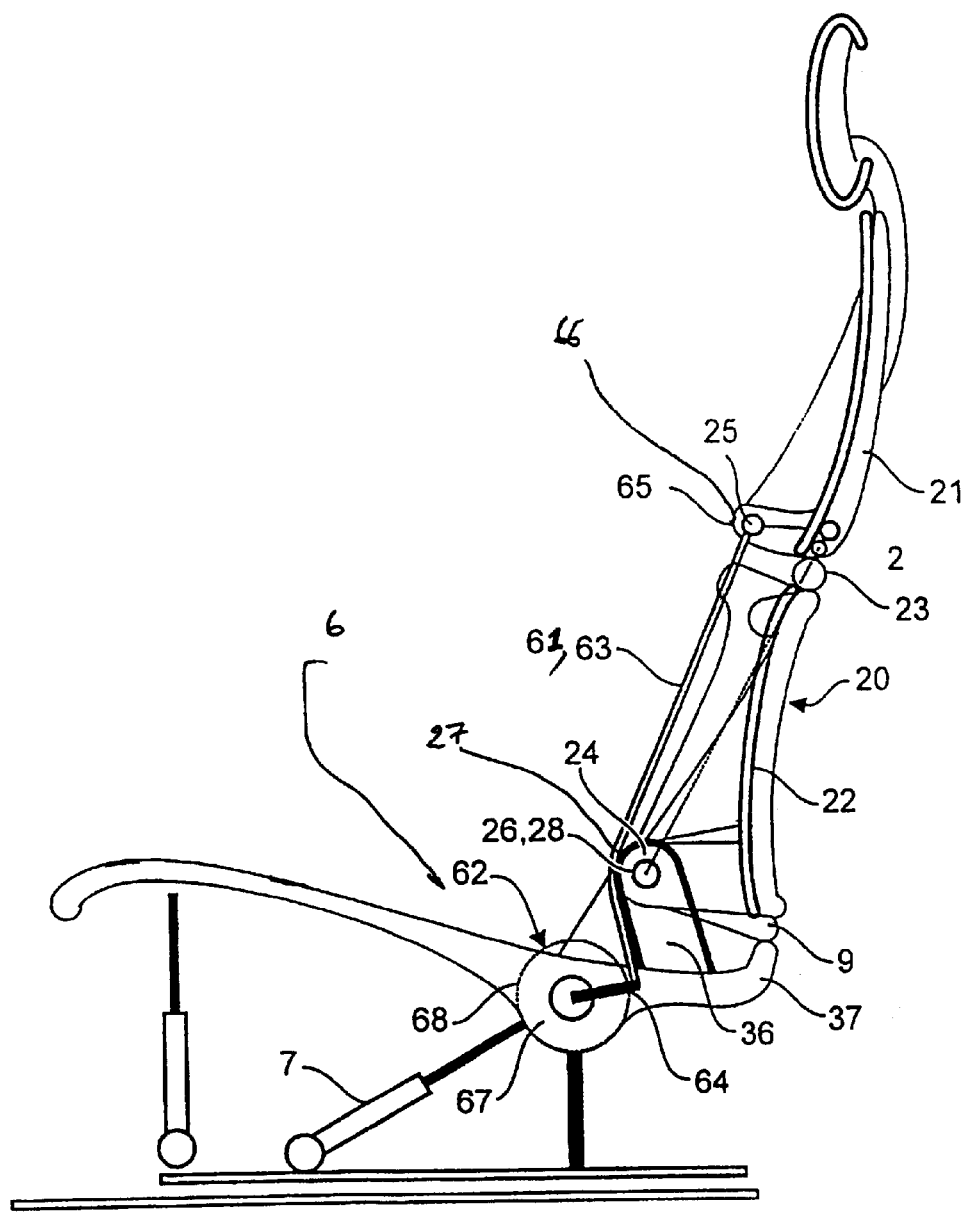
FIG. 4 is a schematic representation of a seat structure that includes a member for setting and/or modifying the angle of the backrest.

FIG. 4 shows a seat structure essentially conforming to that which has already been described with reference to FIG.

1. Only those details which are of importance for the first member 9 for setting the angle of the backrest 2, and the means/mechanism 6 for generating a forward pivoting of the backrest 2 when the seat structure 1 is subjected to a collision or the like will now be described in detail. The means/mechanism 6 for forward pivoting of the backrest 2 when a collision or the like occurs are arranged to cooperate mechanically with the first members via a connection 61.

The connection 61 includes a wire 63 which is secured on the one hand to the backrest 2 and on the other hand to a means/mechanism 62 for straining the wire 63. In a preferred embodiment, this means/mechanism 62 for straining the wire 63 includes members that are connected to the rear articulated arm mechanism 50 and which cooperate with the articulated arm mechanism 50 in such a way that when a collision or the like occurs, the movement of the articulated arm is converted to a straining of the wire 63. The fact that it is a mechanical process which controls the tightening of the wire 63 and thereby the forward pivoting of the seat 3 is advantageous since the speed and magnitude of the pivot movement can be controlled considerably more accurately than if a pyrotechnic strain device were to be used. In a preferred embodiment, a mounting plate 67 is used which can be given a variable diameter if variation of the speed of the change of angle of the backrest is desired as a function of the angle of the said backrest.

A securing arrangement 66 for a wire 63 is arranged at the upper pivot point 54 of the rear articulated arm mechanism 50. The wire 63 has a first end 64 and a second end 65. The first end 64 is secured in the securing arrangement 66. The backrest 2 is secured to the supporting frame 33 of the seat via a hinge 26. The second end 65 is secured to a point on the backrest 3 which is located above the hinge 26. The hinge 26 is located on a first projection 36 which is situated on the supporting frame 33 of the seat and which extends essentially upwards from the plane 105. A corresponding second projection 24 is located on the frame construction 20 of the backrest. This means that the pivot point which is formed by the hinge 26 between the supporting frame 33 of the seat and the frame construction 20 of the backrest is located slightly in front of the outermost end 37 of the supporting frame of the seat. Ideally, in order to obtain great adaptability between the movement of the occupant and the backrest in the event of a collision or the like, the pivot point 28 for the pivoting movement of the backrest will be located at the same point as the axis of rotation between the back and legs of the occupant, i.e. essentially at the same point as the occupant's hip joints. In this embodiment, this is achieved, in accordance with the above description, by the positioning of the hinge 26.

Connected to the hinge 26 are means/mechanism 27 for fixing the wire 63. In order to obtain a forward movement of the backrest 2 in the event of a collision or the like, it is necessary for the wire 63 to be designed to run in front of, as viewed with respect to the longitudinal axis of the vehicle, the axis of rotation 28 defined by the hinge 26. The wire preferably runs in a rack (not shown) which fixes the wire in position. The wire 63 is thus connected between the securing arrangement 66 and the backrest 2 via the fixing means/mechanism 27 connected to the hinge 26.

Figure 5:
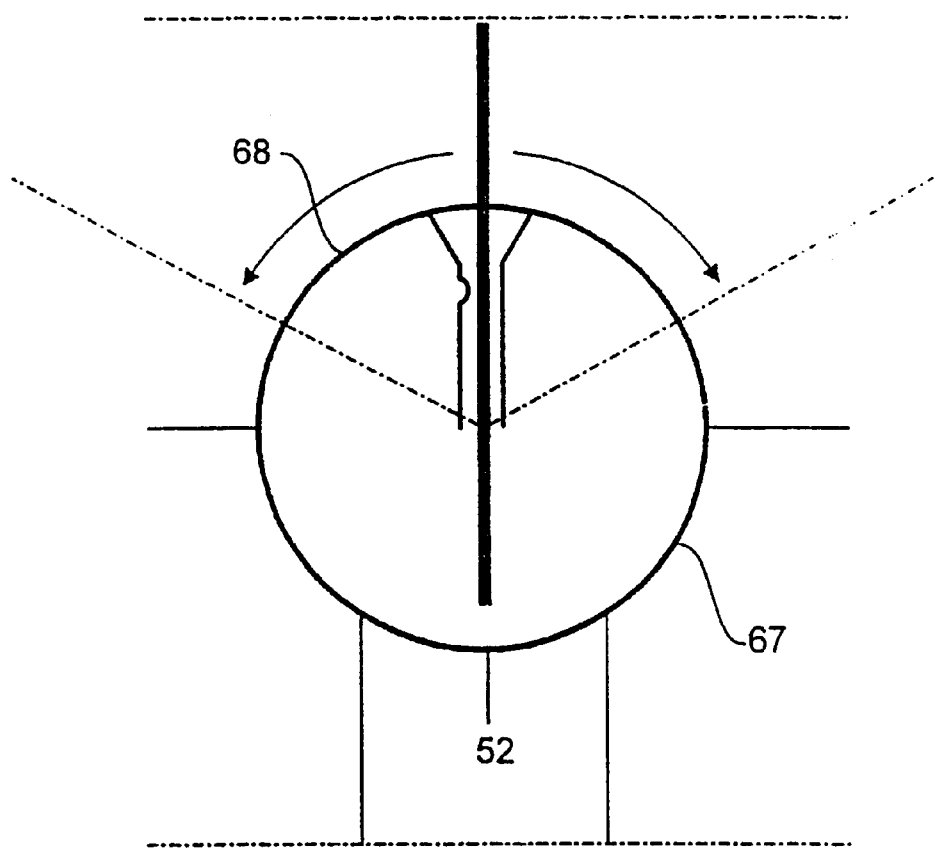
FIG. 5 shows a detail of the member for setting the angle of the backrest.

The securing arrangement 66 is constructed as shown in FIG. 5. A mounting plate 67 is connected to the upper part of the rear articulated arm. The wire 63 is secured to this mounting plate 67 in suitable ways. When the rear articulated arm 51 is pivoted either forwards or rearwards, the wire 63 will be wound up on the periphery 68 of the mounting plate.

The winding can be achieved by ensuring that the rear articulated arm is mounted essentially at right angles in relation to the longitudinal direction of the vehicle. When the articulated, arm is displaced from this position in a collision, the distance between the point of attachment of the wire 63 on the mounting plate 67 will be displaced in relation to the point of deflection 27 of the wire. Since the distance increases between the point of deflection and the point of attachment on the mounting plate, the wire will be wound up on the mounting plate whether the articulated arm is pivoted forwards or rearwards.

In order to ensure that the wire 63 is wound up in the correct way, tracks can be provided in the mounting plate 67. This pivoting causes the wire 63 to be stretched, which means that the second end 65 of the wire is moved downwards in the direction towards the rear articulated arm mechanism 50, which in turn gives rise to the backrest 2 being pivoted forwards. This results in a greater adaptability between the occupant's body and the backrest 2 in the event of a collision or the like, which means that the risk of whiplash injuries in particular is reduced.

In order to obtain sufficient tightening of the wire 63 when the rear articulated arm mechanism 50 is pivoted, the size of the mounting plate 67 can be varied, or the pivot movement can be changed by means of a gear member being inserted between mounting plate 67 and the articulated arm mechanism 40, 50. In a preferred embodiment, the frame construction of the backrest has a lower frame pat 22 and an upper frame part 21 which are joined at a hinge 23. In this case, the second end 65 of the wire is connected to the upper frame part 21. For a tensile force transmitted via the wire 63 to be able to give rise to a pivoting torque via the hinge 23, the upper frame part 21 of the backrest is equipped with a projection 25 to which the upper end 65 of the wire is secured. Such a mounting gives rise to the upper part of the backrest being pivoted forwards with a greater deflection than the lower part of the backrest. This gives rise to a greater fit between the back and neck and the backrest and headrest, respectively, in the event of a collision or the like.

The pivoting of the seat in a collision or the like is limited by deflection-limiting members connected preferably to the hinge 26 or connected to the energy-absorbing member 7.

Arranged between the frame 33 of the seat and the frame structure 20 of the backrest is a member 9 for setting the angle of the backrest. This member 9 has means/mechanism for displacing and fixing the angle of the seat within a small range in the absence of a collision or the like. In the event of a collision or the like occurring, the securement is released utilizing breakpins, tear bands or some other member which yield in the event of a collision or the like because of forces imposed thereupon. The member for setting the angle of the backrest can be, for example, an eccentric screw located between the frame structure of the backrest and the frame of the seat. The frames can then be spring-loaded so as to be pressed towards the eccentric screw. The spring element which exerts the spring loading/biasing can be designed such that it ruptures in the event of a collision or the like.

What is claimed and desired to be secured by Letters Patent is as follows:

1. A seat structure configured to be mounted in a vehicle, said seat structure comprising:
   a backrest;
   a seat having a front part and a rear part;
   a stand arranged to support the seat in a vehicle;
   means for securing the stand in a vehicle; and means for generating a forward pivoting of the backrest relative to the seat when a collision or the like occurs, said means for forwardly pivoting the backrest configured to cooperate mechanically with the stand via a connection means that comprises a wire connecting said stand to the backrest;

wherein when the seat supported by the stand is moved forwardly, the wire causes the backrest to pivot.

2. The seat structure as recited in claim 1, wherein the means for forwardly pivoting the backrest further comprises a mounting plate connected to the stand and on which the wire is intended to be wound up when a collision occurs.

3. The seat structure as recited in claim 1, wherein said wire is arranged to be rolled up on a mounting plate when the forward pivoting of the backrest relative to the seat is generated, thereby forwardly displacing the seat in the vehicle's direction from its first initial position.

4. The seat structure as recited in claim 1, wherein said stand further comprises a first mechanism secured thereto and designed to allow the seat to be displaced, in a trajectory relative to the means for securing the stand, from a first initial position, which the seat has prior to a collision, to a second position when the seat is subjected to the force of a collision.

5. The seat structure as recited in claim 4, wherein the first mechanism further comprises an articulated arm construction configured so that when the seat is displaced forwards from its first initial position, the front part of the seat moves upwards and the rear part of the seat moves downwards.

6. The seat structure as recited in claim 5, wherein the articulated arm construction further comprises a front articulated arm mechanism and a rear articulated arm mechanism, the front articulated arm mechanism, which is secured to the front part of the seat, being longer than the rear articulated arm mechanism, which is secured to the rear part of the seat.

7. The seat structure as recited in claim 6, wherein the rear articulated arm mechanism is secured essentially at right angles to a longitudinal axis of the vehicle and the front articulated arm mechanism forms an angle with the longitudinal axis.

8. The seat structure as recited in claim 7, wherein the wire is secured to the rear articulated arm mechanism.

9. The seat structure as recited in claim 6, wherein the front articulated arm mechanism further comprises means for changing the length of the articulated arm pair.

10. The seat structure as recited in claim 6, wherein the front articulated arm mechanism is of telescopic design.

11. The seat structure as recited in claim 10, wherein the front articulated arm mechanism and the rear articulated arm mechanism each further comprise an articulated arm pair.

12. The seat structure as recited in claim 4, wherein the first mechanism further comprises an articulated arm construction configured so that when the seat is displaced rearwards from the first initial position, the front and rear parts of the seat move downwards.

13. The seat structure as recited in claim 1, wherein the backrest further comprises an upper frame part connected in an articulated manner to a lower frame part, the wire is secured to the upper frame part, the means for forward pivoting of the backrest relative to the seat being arranged also to generate a forward pivoting of the upper frame part relative to the lower frame part.

14. A seat structure configured to be mounted in a vehicle, said seat structure comprising:

a backrest;

a seat having a front part and a rear part;

a stand arranged to support the seat in a vehicle;

a securing mechanism adapted to secure the stand in a vehicle; and a pivoting mechanism arranged to forwardly pivot the backrest relative to the seat in a collision, the pivoting mechanism being configured to cooperate mechanically with the stand via a connection therebetween that comprises a wire connecting the stand to the backrest;

wherein when the seat supported by the stand is moved forwardly, the wire causes the backrest to pivot.

15. The seat structure as recited in claim 14, wherein the pivoting mechanism comprises a mounting plate upon which the wire is wound when a collision occurs.

16. The seat structure as recited in claim 14, wherein said wire is arranged to be rolled upon a mounting plate when the seat is displaced forwards from an initial position.

17. The seat structure as recited in claim 14, wherein said stand further comprises:

a first mechanism configured to allow the seat to be displaced in a trajectory relative to the securing mechanism from an initial position assumed by the seat prior to a collision condition, to a second position assumed by the seat responsive to forces applied thereupon in a collision condition.

18. The seat structure as recited in claim 17, wherein the first mechanism further comprises:

an articulated arm configured so that when the seat is displaced forwards from the initial position, the front part of the seat is moved upwards and the rear part of the seat is moved downwards.

19. The seat structure as recited in claim 18, wherein the articulated arm further comprises:

a front articulated arm mechanism and a rear articulated arm mechanism, the front articulated arm mechanism, which is secured to the front part of the seat, being longer than the rear articulated arm mechanism which is secured to the rear part of the seat.

20. The seat structure as recited in claim 19, wherein the rear articulated arm mechanism is secured at substantially right angles to a longitudinal axis of the vehicle and the front articulated arm mechanism forms an angle with the longitudinal axis of the vehicle.

21. The seat structure as recited in claim 20, wherein the wire is secured to the rear articulated arm mechanism.

22. The seat structure as recited in claim 19, wherein the front articulated arm mechanism further comprises:

a pair of front articulated arms; and an adjustment mechanism configured to change a length of the pair of front articulated arms.

23. The seat structure as recited in claim 22, wherein the adjustment mechanism is telescopically adapted for changing the length of the pair of front articulated arms.

24. The seat structure as recited in claim 23, wherein the front articulated arm mechanism and a rear articulated arm mechanism each further comprise an articulated arm pair.

25. The seat structure as recited in claim 17, wherein the first mechanism further comprises:

an articulated arm configured, so that when the seat is displaced rearwards from the first initial position, the front and rear parts of the seat move downwards.

26. The seat structure as recited in claim 14, wherein the backrest further comprises:

an upper frame part connected in an articulated manner to a lower frame part;

the wire secured to the upper frame part; and the pivoting mechanism configured to pivot the backrest relative to the seat is arranged to generate a forward pivoting of the upper frame part relative to the lower frame part.

* * * * *